United States Patent [19]
Woods

[11] 3,786,432
[45] Jan. 15, 1974

[54] PUSH-POP MEMORY STACK HAVING REACH DOWN MODE AND IMPROVED MEANS FOR PROCESSING DOUBLE-WORD ITEMS

[75] Inventor: William E. Woods, Natick, Mass.

[73] Assignee: Honeywell Information Systems Inc., Waltham, Mass.

[22] Filed: June 20, 1972

[21] Appl. No.: 264,639

[52] U.S. Cl. .......... 340/172.5
[51] Int. Cl. .......... G06f 9/20
[58] Field of Search .......... 340/172.5

[56] References Cited

UNITED STATES PATENTS

| | | | |
|---|---|---|---|
| 3,234,524 | 2/1966 | Roth | 340/172.5 |
| 3,200,379 | 8/1965 | King | 340/172.5 |
| 3,251,042 | 5/1966 | King | 340/172.5 |
| 3,461,434 | 8/1969 | Barton | 340/172.5 |
| 3,496,550 | 2/1970 | Schachner | 340/172.5 |
| 3,546,677 | 12/1970 | Barton | 340/172.5 |
| 3,553,651 | 1/1971 | Bird | 340/172.5 |
| 3,629,857 | 12/1971 | Faber | 340/172.5 |

*Primary Examiner*—Gareth D. Shaw
*Assistant Examiner*—John P. Vandenburg
*Attorney*—John S. Solakian et al.

[57] ABSTRACT

A first in-last out (i.e. push-pop, push-down, or last in-first out) memory stack is implemented with means for reaching down into the stack without pushing or popping thereby allowing access to information which would not otherwise be immediately available. The stack also features improved processing of double-word items by use of unique double push and double pop algorithms.

12 Claims, 2 Drawing Figures

| CONTROL COMMANDS | INSTRUCTION | | | |
|---|---|---|---|---|
| | SINGLE PUSH | DOUBLE PUSH | SINGLE POP | DOUBLE POP |
| DECREMENT S | 1 | 1,9 | | |
| S TO MR | 2 | 2 | 1 | 2 |
| MR TO ADD | 3 | 3 | 2,7 | 3,8,16 |
| ADD TO MAB | 4 | 4 | 3 | 4 |
| MAB TO Y | 5 | 5,12 | 4 | 5,13 |
| A TO MR | 6 | 13 | | |
| MR TO MDB | 7 | 7,14 | | |
| MDB TO M | 8 | 8,15 | | |
| B TO MR | | 6 | | |
| DECREMENT Y | | 10 | | 11 |
| Y TO MAB | | 11 | | 12 |
| M TO MDB | | | 5 | 6,14 |
| MDB TO MR | | | 6 | 7,15 |
| ADD TO A | | | 8 | 17 |
| INCREMENT S | | | 9 | 1,10 |
| ADD TO B | | | | 9 |

PUSH-POP MEMORY STACK HAVING REACH DOWN MODE AND IMPROVED MEANS FOR PROCESSING DOUBLE-WORD ITEMS

BACKGROUND OF THE INVENTION

The present invention relates generally to data processing systems and more particularly to push-pop memory stacks used in such data processing systems.

A push-pop memory stack is typically used in those applications where the last word written into the stack is the first word to be retrieved therefrom. Should access to a word buried within the stack be required, it has been necessary to remove more recently written words until the word desired was accessable at the top of the stack. This required a routine whereby the most recently written words were temporarily stored and then rewritten into the stack in their original sequence. Further the use of a memory stack for double-word operations such as required for double-precision arithmetic has required excessive processing to effect ordered transfer of the two words from the stack to an accumulator. This has been necessitated since the least significant word was placed in the memory stack first and had to be retrieved first in order to expedite the propagation of carry/borrow information in extended precision arithmetic operations in the accumulator.

Accordingly, one object of the invention is to provide a technique whereby formerly stored information may be retrieved from a push-pop memory stack without necessitating the removal of more recently stored information.

A further object of the invention is to provide a push-pop memory stack having an improved technique for pushing and popping double-word items.

SUMMARY OF THE INVENTION

The above and other objects of the invention are attained by providing a push-pop memory stack coupled with apparatus comprising a stack pointer which provides the top address (i.e. the address of the last entered item) of the memory stack and which is capable of incrementing of decrementing dependent upon the operation being or to be performed, and a memory register coupled with the stack pointer for providing an address to the memory stack and coupled to provide or receive the information in the addressed location of the memory stack. In order to reach down into the memory stack, the stack pointer is coupled with an adder and the address indicated by the stack pointer is modified by the reach-down or index instruction, which modified address is then provided to the memory stack by means of a memory address bus. Double-word operations are provided by means of a further register coupled with the memory address bus. The contents of the further register are decremented during the double push or double pop operations on the memory stack and the stack pointer is incremented or decremented in such a way as to minimize processing operations.

BRIEF DESCRIPTION OF THE DRAWINGS

The manner in which the apparatus of the present invention is constructed, and its mode of operation, will best be understood in the light of the following detailed description, together with the accompanying drawings, in which.

DETAILED DESCRIPTION OF THE PREFERRED EMBODIMENT

Figures 1, 2:
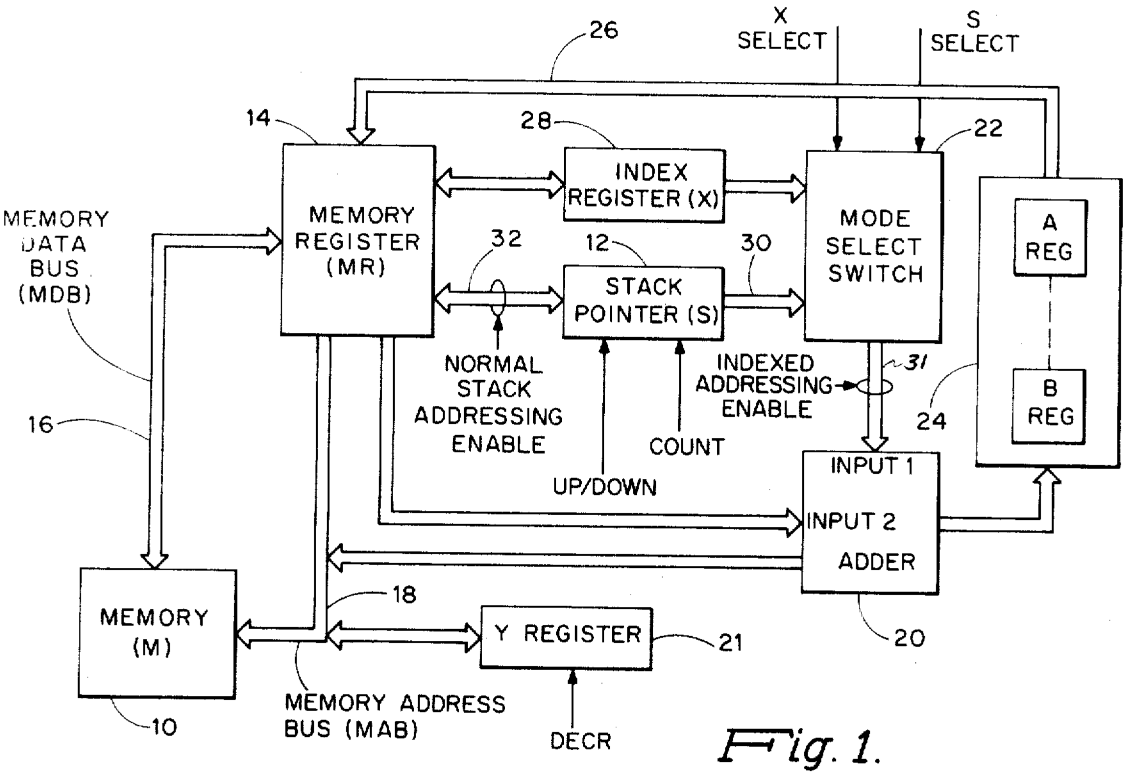
FIG. 1 is a block diagram of the apparatus of the invention.
FIG. 2 is a state diagram of typical ones of the control commands required for certain instructions utilized with the aparatus of the invention.

FIG. 1 illustrates a memory 10 which includes a memory stack. The memory stack is of the push-pop type and may be said to resemble a cafeteria plate stacker, that is, the last plate stacked is the first plate removed. For purposes of explanation, when operating with the stack, the stack pointer 12 always points to the top of the memory stack (i.e., the address of the item which was most recently written therein). It is assumed for ease of explanation that the items below the top of the memory stack i.e., the earlier written items, have the higher memory addresses.

The memory stack of memory 10 is coupled with a memory data register 14 by means of a memory data bus 16 which is coupled for transfer of information between memory 10 and register 14. Also coupled between memory 10 and register 14 is the memory address bus 18 which is coupled to present addresses to memory 10 from any of several sources, including at least memory register 14, adder 20 and Y register 21. Adder 20 includes two input terminals, the first being coupled to receive an input from the mode select switch 22 via line 31 when gates (not shown) associated with line 31 are enabled by the indexed addressing enable signal and the second being coupled to receive an input from memory data register 14. One output from adder 20 is coupled with the memory address bus 18 whereas the other output of adder 20, which other output may be the same as the first mentioned output of adder 20, is coupled to transfer information to an accumulator 24. Accumulator 24 includes an A register and a B register which are coupled to one another by the dotted line path shown in addition to other paths not shown. Accumulator 24 is shown to provide an output from either the A register or the B register on bus 26 to memory register 14. Also shown in FIG. 1 is an index register 28 which may be utilized during the normal indexing operations of the processor of the apparatus shown in FIG. 1.

The mode select switch 22, which may be simply two AND gates, is coupled to provide the output of register 28 or stack pointer 12 to the first input of adder 20. When the switch 22 receives an X select signal, and provided that the indexed addressing enable signal is present, the contents of register 28 will be provided to input-1 of adder 20 and if the S select signal is provided to switch 22, then the contents of stack pointer 12 are provided to input-1 of adder 20 via line 30. The index addressing enable signal is thus provided during the indexed (normal or stack) operation of the memory 10. During the reach-down or indexed stack operation, the address contained in stack pointer 12 and provided to input-1 of adder 20 is modified by the instruction received from the memory 10 via memory register 14. Thus if the third location down in the memory stack must be addressed, then the instruction provided for and received from register 14 would include an address displacement of 3 in which case the address from the stack pointer 12 would be augmented by 3 and accordingly because of the increasingly numbered addresses as we go down into the memory stack, the proper location will be addressed. Note that the addresses as one goes down into the memory stack could have been decreasingly numbered in which case adder 20 would be substituted for by a subtractor.

The path between stack pointer 12 and register 14 is that used during normal stack addressing and such path as indicated by line 32 is enabled by the necessary gating in response to the normal stack addressing enable signal. During normal operation the stack pointer 12 is incremented or decremented depending upon whether the operation is a push or pop and/or a double push or double pop operation. Acutally, stack pointer 12 is a reversable counter which is, depending upon the operation required, set in the up or down mode and counts up or down upon receipt of a count signal. During a single push operation for example, and since the stack pointer addresses the top of the memory stack, the stack pointer 12 counts down by one after which the memory stack is addressed and the information is transferred from register 14 to such addressed location in the memory stack. During a single pop operation, and since the stack pointer 12 points to the top of the memory stack which is the location to be accessed, the stack pointer 12 is not decremented, rather the contents of the location addressed are sent to the register 14 after which the stack pointer 12 is incremented, that is, after which the stack pointer 12 is set in the up mode and the count signal is received to update the address contained in stack pointer 12 by one. During the double push, and double pop operations, in addition to the decrementing or incrementing of the stack pointer 12, the Y register 21 is additionally utilized and decremented during such operations. This will be more particularly seen with reference to FIG. 2.

In FIG. 2 there are shown four basic types of instructions utilized during the push and pop operations in addition to the control commands required in order to implement such operations. The order in which the control commands are sequenced in order to perform the given instruction are indicated by the various numbers associated therewith. In some cases a control command may be activated more than once and in such case more than one number is indicated. It should be understood that although the sequence of the control commands are generally as indicated, in fact in certain cases, the order of such control commands may be changed or some of the control commands may be enabled simultaneously without departing from the scope of the invention. The various operations will now be discussed, it being understood that during each of these operations, the path 32 is enabled by the normal stack addressing enable signal whereas switch 22 as well as path 31 are not enabled. The indexed stack addressing will be further discussed hereinafter.

It is assumed that the stack pointer 12 addresses the top location of the memory stack, the top location being that location having the most recently entered information. For the single push operation the stack pointer 12 is decremented in order to point to the next available position in the stack where information may be written. The address contained in the stack pointer 12 is then transferred to register 14 and via adder 20 to memory address bus 18. The adder 20 does not modify the address received from register 14 because mode select switch 22 is not enabled such that no signal is provided and therefore input-1 of adder 20 is effectively clamped to zero. The address received via adder 20 as stated is received on the memory address bus and is utilized to address the memory stack of memory 10. The information on memory address bus 18 is also transferred to the Y register 21. The Y register is typically used as a display register for the address presently presented to the memory 10. Accordingly all addresses received by memory address bus 18 are received by the Y register 21. It will be seen hereinafter for the double push and double pop operations how this register 21 may be utilized to facilitate such operations. Thus in some cases as in single push and single pop operations it can be seen that the control command directing the address on the memory address bus 18 to Y register 21 is a don't care situation in that it is not necessary for the purposes of the present instruction but is automatically provided by the system. The memory stack having been addressed, information is then transferred thereto and for purposes of illustration it is shown that the A register of accumulator 24 is utilized to furnish the information via memory register 14 after which such information is transferred over memory data bus 16 to memory 10 at the addressed location of the memory stack. This completes the single push operation.

The single pop operation will now be discussed. Since the stack pointer 12 is pointing to the location in the memory stack which is to be accessed, (i.e., read from) there is no need to increment or decrement the stack pointer 12 at this time. Accordingly the first control command provides for the transfer of the contents of the stack pointer to the memory register 14 and via the adder 20 to the memory address bus 18 and in accordance with the explanation for the single push operation to Y register 21 which in this case is not a necessary operation. The contents of the location addressed in memory 10 are then transferred via the memory data bus 16 to the memory register 14 and via the adder 20 to in this case the A register. The stack pointer 12 is then incremented so as to point to the next location in the stack, it being noted that the next location is at a higher numbered address as hereinbefore stated.

The double push operation will now be described. The first five steps of the double push operation are the same as the first five steps of the single push operation, that is, after the stack pointer 12 is decremented, the memory 10 is addressed. For purposes of illustration we may assume that the A register includes the most significant bits of a double precision word and the B register includes the least significant bits of the double precision word, and further that the contents of the B register of accumulator 24 will be loaded into the memory stack first, after which the contents of the A register will be so loaded. Thus, during the sixth step of the double push operation, the content of the B register are transferred via bus 26 to register 14 and thence over the memory data bus 16 to the memory stack. The stack pointer 12 is then decremented and the Y register 21 is also decremented. The contents of the Y register 21 which now duplicate the stack pointer contents, are transferred to the memory address bus 18 in order to address the memory stack. This simplifies the manner in which the memory stack is addressed during the second push of the double push operation, that is, the memory stack need not be addressed by the stack pointer 12, thereby saving additional processing time. After the memory stack is addressed by the contents of the Y register 21, the address on the memory address bus 18 is transferred back to the Y register 21, this again not being a required operation. The contents of the A register are then transferred over bus 26 to the memory register 14 and finally to the memory stack via the memory register 14 and the memory data bus 16.

Having stored the least significant bits and then the most significant bits in the memory stack, it is desirable to read such information from the memory stack in the same order in which such information is stored therein. That is, if the contents of the B register are stored in the stack first and then the contents of the A register are stored in the stack, it is desirable to retrieve the former contents of the B register first and then the former contents of the A register. The reason that the least significant bits must be retrieved first is that such least significant bits must be loaded into the B register of accumulator 24 in order that any arithmetic operation involved has the opportunity to effect a carry operation before the most significant bits are added thereto. If the least significant bits are not retrieved from the memory stack first, then it would be necessary to utilize additional time to permit re-processing the most significant bits whenever a carry is generated by the operation on the least significant bits in the B register of accumulator 24. By the tenchique to be presently shown it is not necessary to utlize this extra time nor the associated control logic. Accordingly in the first step of the double pop operation, the stack pointer 12 is incremented to point to the first entered word of the double word item. The contents of the stack pointer 12 are sent to the memory register 14 and via the adder 20 (which does not modify the address) to the memory address bus. This address in addition to being stored in Y register 21 is also utilized to address memory 10. The contents of the memory stack are transferred via the memory data bus 16 to the memory register 14 and via input-2 of adder 20 to the B register of accumulator 24. The stack pointer 12 is then again incremented in order to point to the next location in the memory stack which is to be accessed after the second word of the double word item is accessed. That is the second word or last entered word of the double word item is two addresses displaced from the lower in address number than the address indicated in the stack pointer after such stack pointer 12 has been incremented twice during the double pop operation. As the stack pointer 12 is being incremented for the second time during step 10, the Y register 21 is decremented so that it now points to the second (more significant) word of the double word item. The address in the Y register 21 is now utilized to address the memory stack via the memory bus 18 and the address is then transferred back to the Y register 21 in a don't care situation during step 13. The contents of the memory stack are then transferred by the memory data bus 16 to the memory register 14 and via the adder 20 to the A register in accumulator 24. Thus it can be seen that the stack pointer and Y register in combination in the double pop operation effectively minimize the amount of processing time required to utilize the memory stack during the operation on double word items.

Having discussed the various push and pop operations as shown in FIG. 2, the reach down or index operation with the memory stack will now be further discussed. During the reach-down mode, the path 32 is disabled and the path 31 is enabled by means of the indexed addressing enable signal. Accordingly, the mode select switch 22 is allowed to transfer the contents of either the index register 28 or the stack pointer 12 to adder 20. During normal operation of the processor of the apparatus shown in FIG. 1, indexing operations normally enable the index register 28 by means of the X select signal which causes the transfer of the contents of register 28 to the adder 20. However, when the memory stack is to be utilized in the index mode, then the S select signal is enabled thereby passing the contents of the stack pointer 12 to the adder 20. Thus with an instruction indicating that the nth position down in the memory stack is to be accessed, this instruction is received via memory register 14 on the memory data bus 16 from memory 10 or another source and the information is coupled to input-2 of the adder 20, the information being the number represented by the letter n. With the address of the top of the memory stack indicated by the stack pointer 12 received at input-1 and the modifier n received at input-2 of adder 20, a modified address is formed and transfer via the memory address bus 18 to address the buried item in the location of the memory stack addressed. This accordingly does not require any disturbance of the items stored above the item accessed in the stack.

Having described the invention, what is claimed as new and novel and for which it is desired to secure Letters Patent is:

1. Data processing apparatus comprising:

A. a memory having a last in-first out memory stack operative such that the most recent information written into said stack is normally the information to be next read from said stack;

B. memory register means;

C. means, coupled to said memory register means, for indicating the location in said memory to be addressed;

D. means for enabling said memory register means to address the location in said memory indicated by said means for indicating;

E. means for enabling the transfer of information between the addressed location in said memory and said memory register means;

F. means for changing the addressed location indicated by said means for indicating in response to either the writing of information into said memory or the reading of information from said memory, said means for changing including means for updating said means for indicating by either incrementing or decrementing said means for indicating during said writing and/or reading with said stack;

G. arithmetic means;

H. means for indicating a displacement number associated with a location in said stack which is not the most recent location written into;

I. means in said arithmetic means for operating on said displacement number representing the location indicated by said means for indicating to produce a reach-down address; and J. means for addressing said stack with said reach-down address in order to read or write information at said reach-down address without addressing other locations of said stack.

2. Apparatus as in claim 1 wherein said means for changing updates said addressed location before information is written into said memory and wherein said means for changing updates said addressed location after information is read from said memory.

3. Apparatus as in claim 1 further comprising a first register coupled to receive each address received by said memory from said memory register means.

4. Apparatus as in claim 3 wherein said information in each of said locations in said stack are words and further comprising means for writing each word of a double word item into successive locations of said stack, said means for writing comprising:

A. means, included in said means for changing, for updating the number of the addressed location indicated by said means for indicating in a first direction to produce a first address;

B. means, coupled with each of said means for enabling, for writing the first word of said double word item in the location indicated by said first address;

C. means for updating the address included in said first register in said first direction in order to produce a second address; and D. means enabling said first register to provide said second address to said memory in order to enable the writing of the second word of said double word item in the location indicated by said second address.

5. Apparatus as in claim 3 wherein said information in each of said locations in said stack are words and further comprising means for reading each word of a double word item from successive locations of said stack, said means for reading comprising:

A. means, included in said means for changing, for updating the number of the addressed location indicated by said means for indicating in a second direction to produce a first address;

B. wherein said memory register means provides said first address to said memory in order to enable the reading of the second word of said double word item from the location indicated by said first address;

C. means for updating the address included in said first register in a first direction in order to produce a second address; and D. means enabling said first register to provide said second address to said memory in order to enable the reading of the first word of said double word item from the location indicated by said second address.

6. Apparatus as in claim 5 further comprising means for causing said means for updating to update the number of the addressed location indicated by said means for indicating in said second direction to produce a third address, said third address being the address of the next location to be read from.

7. Data processing apparatus comprising:

A. a last in-first out memory stack, said stack operative such that the most recent information written into said stack is normally the information to be next read from said stack;

B. a stack pointer for providing an address of a location in said stack, said stack pointer normally including an address pointing to the next to be read from location in said stack;

C. means for changing the address location indicated by said stack pointer in response to instructions directing either the writing of information into said stack or the reading of information from said stack;

D. means for indicating a displacement address;

E. means for operating on said displacement address and said address normally included in said stack pointer to generate a first address; and F. means for addressing said stack with said first address in order to read or write information at said location in said stack represented by said first address without addressing the location of more recently written information in said stack.

8. Apparatus as in claim 7 further comprising:

A. an index register;

B. a memory, said memory including said stack; and

C. switch means for enabling the contents of said index register to address said memory, said switch means including means for inhibiting said stack pointer from addressing said stack.

9. Apparatus as in claim 8 wherein the contents of both said stack pointer and said index register provide a displacement address from a reference address and wherein said switch means is coupled to transfer the contents of either said index register or said stack pointer to said means for operating in order to generate said first address.

10. Data processing apparatus comprising:

A. a memory stack operative such that the most recent word written into said stack is the word to be next read from said stack;

B. a stack pointer for providing an address of a word location in said stack, said pointer normally including an address of the next to be read from word location in said stack;

C. a first register; and

D. means for writing each word of a double word item into successive word locations of said stack, said means for writing comprising:

1. means for changing the address in said stack pointer by one address in a first direction to produce a first address,
2. means for transferring said first address to said first register,
3. means for addressing said stack with said first address,
4. means for writing a first word of said double word item into the word location of said stack indicated by said first address,
5. means for changing said first address in said first register by one address in said first direction to produce a second address,
6. means for addressing said stack with said second address, and
7. means for writing a second word of said double word item into the word location of said stack indicated by said second address.

11. Apparatus as in claim 10 further comprising means for changing said first address in said stack pointer by one address in said first direction to produce said second address, said second address pointing to the next to be read from word location in said stack.

12. Data processing apparatus comprising:

A. a memory stack operative such that the most recent word written into said stack is the word to be next read from said stack;

B. a stack pointer for providing an address of a word location in said stack, said pointer normally including an address of the next to be read from word location in said stack;

C. a first register; and

D. means for reading each word of a double word item from successive word locations of said stack, said means for reading comprising:
1. means for changing the address in said stack pointer by one address in a second direction to produce a first address,
2. means for transferring said first address to said first register,
3. means for addressing said stack with said first address,
4. means for reading a first word of said double word item from the word location of said stack indicated by said first address,
5. means for changing said first address in said stack pointer by one address in said second direction to produce a third address, said third address pointing to the next to be read from word location in said stack after the second word of said double word item is read from said stack,
6. means for changing said first address in said first register by one address in a first direction to produce a second address,
7. means for addressing said stack with said second address, and
8. means for reading said second word of said double word item from the word location of said stack indicated by said second address.

* * * * *